US011038375B2

(12) United States Patent
Walley et al.

(10) Patent No.: US 11,038,375 B2
(45) Date of Patent: *Jun. 15, 2021

(54) POWER TRANSMITTING UNIT WITH ADJUSTABLE FIELD AND METHODS FOR USE THEREWITH

(71) Applicant: Avago Technologies International Sales Pte. Limited, Singapore (SG)

(72) Inventors: John Stuart Walley, Ladera Ranch, CA (US); Vadim Bishtein, Sunnyvale, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 341 days.

This patent is subject to a terminal disclaimer.

(21) Appl. No.: 16/038,903

(22) Filed: Jul. 18, 2018

(65) Prior Publication Data

US 2018/0342901 A1    Nov. 29, 2018

Related U.S. Application Data

(63) Continuation of application No. 14/974,390, filed on Dec. 18, 2015, now Pat. No. 10,056,786.
(Continued)

(51) Int. Cl.
*H02J 50/12* (2016.01)
*H02J 50/80* (2016.01)
(Continued)

(52) U.S. Cl.
CPC ............. *H02J 50/12* (2016.02); *H02J 7/025* (2013.01); *H02J 50/40* (2016.02); *H02J 50/80* (2016.02);
(Continued)

(58) Field of Classification Search
CPC .. H02J 50/12; H02J 7/025; H02J 50/40; H02J 50/80; H02J 7/00034; H04B 5/0037; H04B 5/0081
See application file for complete search history.

(56) References Cited

U.S. PATENT DOCUMENTS 3,447,419 A * 6/1969 Foster .................... B23Q 15/22
                                                              409/218
10,056,786 B2 * 8/2018 Walley .................... H02J 50/80
(Continued)

FOREIGN PATENT DOCUMENTS

WO    02016019159 A1    1/2016

OTHER PUBLICATIONS

Budhia, "Design and Optimization of Circular Magnetic structures for Lumped Inductive Power Transfer Systems," IEEE Transaction on power Electronics, Nov. 2011, vol. 26, No. 11, pp. 3096-3108.

*Primary Examiner* — Pinping Sun
(74) *Attorney, Agent, or Firm* — Foley & Lardner LLP (57) ABSTRACT

In various embodiments, a power transmitting device includes a wireless power generator configured to generate a wireless power signal. A transmit resonator is configured to transmit the wireless power signal via a transmit magnetic field to a power receiving unit. The transmit resonator includes a transmit coil configured to generate that transmit magnetic field in response to the wireless power signal. At least one variable magnetic element is configured to adjust at least one property of the transmit coil by varying a reluctance of the at least one variable magnetic element in response to at least one control signal. A processing device is configured to generate the at least one control signal to select the reluctance corresponding to the at least one property of the transmit coil.

22 Claims, 8 Drawing Sheets

Related U.S. Application Data (60) Provisional application No. 62/253,915, filed on Nov. 11, 2015.

(51) Int. Cl.
    *H02J 7/02*         (2016.01)
    *H04B 5/00*       (2006.01)
    *H02J 50/40*      (2016.01)

(52) U.S. Cl.
    CPC ......... *H04B 5/0037* (2013.01); *H04B 5/0081* (2013.01)

(56) References Cited

U.S. PATENT DOCUMENTS

| | | |
|---|---|---|
| 2007/0222629 A1 | 9/2007 | Yoneyama |
| 2010/0070219 A1 | 3/2010 | Azancot |
| 2011/0122026 A1 | 5/2011 | DeLaquil et al. |
| 2011/0266880 A1* | 11/2011 | Kim ..................... H02J 50/12 307/104 |
| 2012/0091820 A1* | 4/2012 | Campanella ............. H03H 7/40 307/104 |
| 2012/0119698 A1* | 5/2012 | Karalis ................. B60L 11/182 320/108 |
| 2012/0235509 A1 | 9/2012 | Ueno |
| 2013/0093390 A1* | 4/2013 | Partovi ................... H02J 5/005 320/108 |
| 2013/0249479 A1* | 9/2013 | Partovi ................ H04B 5/0087 320/108 |
| 2014/0162554 A1 | 6/2014 | Sankar |
| 2014/0184150 A1 | 7/2014 | Walley |
| 2015/0123679 A1 | 5/2015 | Kuyvenhoven |
| 2015/0302985 A1* | 10/2015 | Kurs ...................... H02J 50/50 307/104 |
| 2016/0005531 A1* | 1/2016 | Sullivan ............... H01F 17/0013 307/104 |
| 2016/0043562 A1 | 2/2016 | Lisi |
| 2016/0099758 A1* | 4/2016 | Bell ........................ H02J 7/025 307/104 |

\* cited by examiner

POWER TRANSMITTING UNIT WITH ADJUSTABLE FIELD AND METHODS FOR USE THEREWITH

CROSS-REFERENCE TO RELATED APPLICATIONS

The present U.S. Utility patent application claims priority pursuant to 35 U.S.C. § 120 as a continuation of U.S. Utility application Ser. No. 14/974,390, entitled "POWER TRANSMITTING UNIT WITH ADJUSTABLE FIELD AND METHODS FOR USE THEREWITH", filed Dec. 18, 2015, which claims priority pursuant to 35 U.S.C. § 119(e) to U.S. Provisional Application No. 62/253,915, entitled "POWER TRANSMITTING UNIT WITH ADJUSTABLE FIELD AND METHODS FOR USE THEREWITH", filed Nov. 11, 2015, both of which are hereby incorporated herein by reference in their entirety and made part of the present U.S. Utility patent application for all purposes.

BACKGROUND TECHNICAL FIELD

Various embodiments relate generally to wireless communication systems and also to wireless charging of devices.

DESCRIPTION OF RELATED ART

Communication systems are known to support wireless and wireline communications between wireless and/or wireline communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, Bluetooth Low Energy (BLE), advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

The Alliance for Wireless Power (A4WP) has promulgated a baseline systems specification for interoperability of loosely coupled wireless power transfer for portable, handheld electronic devices. This specification supports a 6.78 MHz for power transfers and a 2.4 GHz operating frequency for management data transfers. The Wireless Power Consortium (WPC) has also promulgated standards used for wireless charging of mobile devices, notably the Qi low power specification.

DETAILED DESCRIPTION

Figure 1:
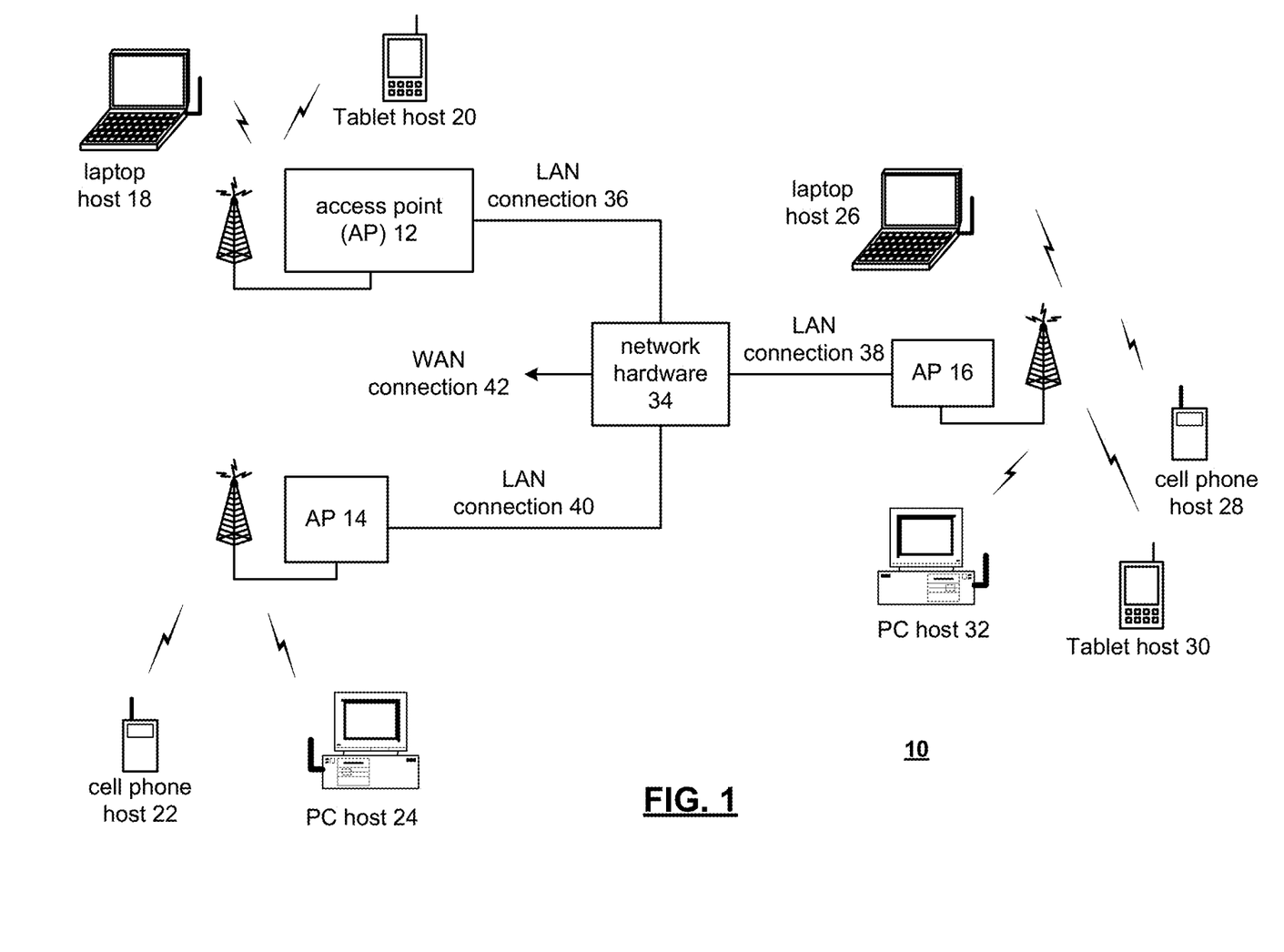
FIG. 1 is a schematic block diagram of an embodiment of a wireless communication system.

FIG. 1 is a schematic block diagram illustrating a communication system 10 that includes a plurality of access points 12-16, a plurality of wireless communication devices 18-32 and a network hardware component 34 (for example, a bridge, switch or router). The wireless communication devices 18-32 may be laptop host computers 18 and 26, tablet hosts 20 and 30, personal computer hosts 24 and 32, cell phone hosts 22 and 28 and/or other wireless devices.

The access points 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the access points 12-16 has an associated antenna or antenna array to communicate with the wireless communication devices in its area. Typically, the wireless communication devices register with a particular access point 12-14 to receive services from the communication system 10. For direct connections (i.e., point-to-point communications), wireless communication devices communicate directly via agreed upon frequencies.

Typically, access points 12-16 are used for in-home or in-building wireless networks however base stations can similarly be employed, for instance, for cellular telephone systems and like-type systems. Regardless of the particular type of communication system, each wireless communication device includes a built-in radio and/or is coupled to a radio.

In an embodiment, one or more of the communication devices 18, 20, 22, 24, 26, 28, 30 and 32 operate over an additional wireless network, such as a wireless personal area network. For example, the access points 12, 14 and 16 could operate in accordance with a wireless local area network protocol such as an IEEE 802.11 protocol and one or more wireless communication devices 18, 20, 22, 24, 26, 28, 30 and 32 could operate using Bluetooth. In this case, IEEE 802.11 and Bluetooth communications could both use the 2.4 GHz frequency band. For instance, the laptop host 18 may communicate via Bluetooth technology such as Classic Bluetooth (IEEE 802.15.1) Bluetooth LE (Bluetooth 4.0) or other Bluetooth technology with a keyboard, a mouse, a printer, a mobile phone, a tablet, and/or a set of headphones or speakers. These devices and the laptop host 18 may form an ad-hoc Bluetooth piconet. Generally, a Bluetooth piconet may comprise a master device or terminal and up to seven slave devices or terminals. In this exemplary implementation, the laptop host 18 may correspond to the master Bluetooth terminal and be coupled to one or more the peripheral devices, such as a headset, printer, keyboard, pointing device or other peripheral devices that may correspond to the slave Bluetooth terminals. Similarly, cell phone host 22 could communicate via Bluetooth technology with a Bluetooth headset and place wireless telephone calls, such as a voice over IP call placed via an access point or via 3G or 4G call placed via a base station.

In an embodiment, wireless connections are established between two or more wireless communication devices 18, 20, 22, 24, 26, 28, 30 and/or 32. The process of establishing a wireless connection between two devices can include several steps involving the exchange of information.

In various embodiments, the wireless communication devices 18, 20, 22, 26, 28 and 30 represent examples of mobile communication devices that operate from a battery. One of more of these devices includes a power receiving unit that can receive a wireless power signal from a power transmitting unit (not explicitly shown) to wirelessly charge the battery and/or to provide other system power. The power receiving unit of such wireless communication devices 18, 20, 22, 26, 28 and 30 and/or the power transmitting unit that transfers wireless power to such wireless communication devices 18, 20, 22, 26, 28 and 30 can include one or more functions an features that will be described in conjunction with FIGS. 2-14 that follow.

Figure 2:
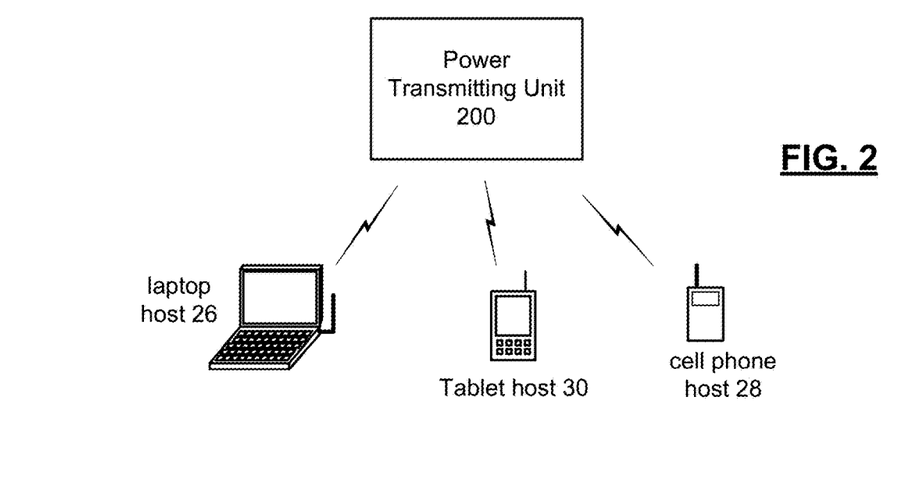
FIG. 2 is a schematic block diagram of an embodiment of a wireless charging system.

FIG. 2 is a schematic block diagram of an embodiment of a wireless charging system. A power transmitting unit 200 is shown for wirelessly charging a number of wireless devices such as laptop host 26, tablet host 30 and/or cell phone host 28. While specific devices are shown, the wireless communication devices 18, 20, 22, 26, 28 and 30 and corresponding peripheral devices, such as a keyboard, a mouse, a printer, a microphone, headset, headphones, speakers or other peripheral can each be wirelessly charged via a power transmitting unit, such a power transmitting unit 200. While shown as a separate device, the power transmitting unit 200 can be incorporated in a server, an access point, an article of furniture, or any other device that can be placed or is otherwise located in proximity to the devices to be charged.

In one example of operation, power transmitting unit (PTU) 200 can operate in accordance with a loosely coupled wireless power transfer specification such as the A4WP baseline system specification 1.0 (BSS 1.0) or other wireless power transfer technology. In this embodiment, the laptop host 26, tablet host 30 and/or cell phone host 28 operates as a power receiving unit (PRU). In this example, a 6.78 MHZ signal is sent from the power transmitting unit 200 to the PRUs to transfer energy to charge each device in conjunction with a charging session for each device. Control information can be exchanged between the PTU 200 and each of the PRUs via a 2.4 GHz Bluetooth LE compatible link to control the power transfer to the PRU. In operation, a wireless connection can be established been the PTU 200 and a corresponding wireless communication device such as laptop host 26, tablet host 30 or cell phone host 28 via Bluetooth LE.

The PTU 200 can include a transmit resonator having a control element that allows the magnetic field produced by the PTU to be steered or otherwise controlled, and/or that allows the impedance of the transmit resonator to be controlled to improve power transfer to the PRU. Further details including several optional functions and features are described in conjunction with FIGS. 3-14 that follow.

Figure 3:
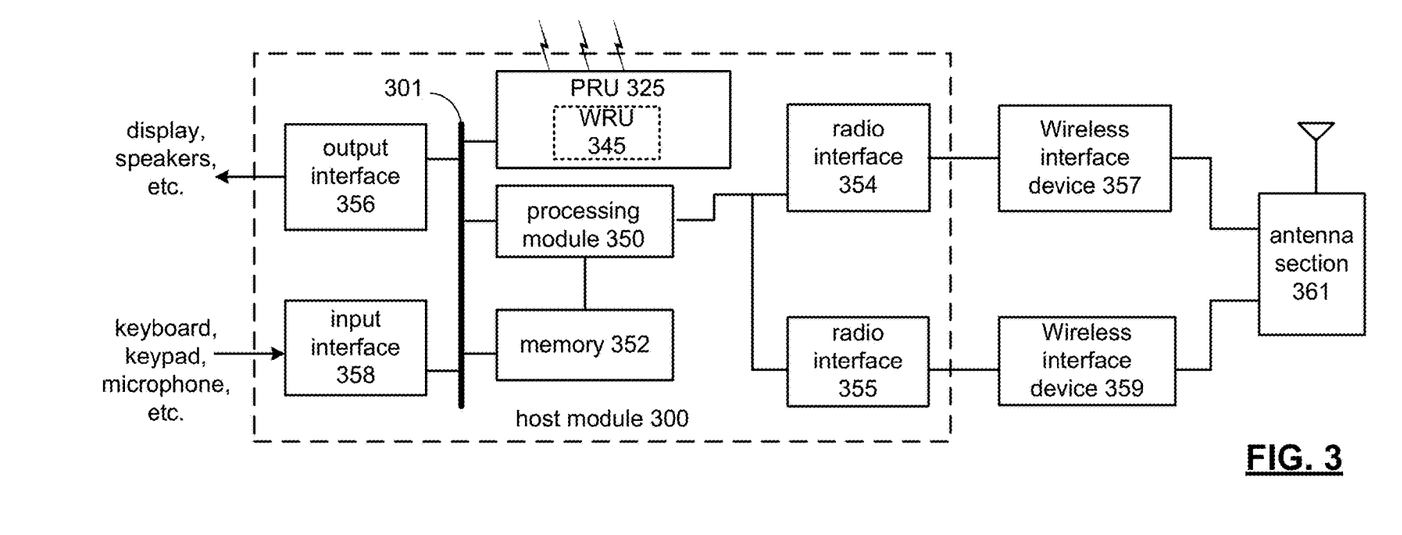
FIG. 3 is a schematic block diagram of an embodiment of a wireless communication device.

FIG. 3 is a schematic block diagram of an embodiment of a wireless communication device. A wireless communication device, such as 18, 20, 22, 26, 28 and 30 or an associated peripheral device includes the host module 300 and one or more at least one wireless interface devices 357 and 359. The wireless interface devices 357 and 359 can be implemented via a wireless interface circuit with a single integrated circuit, or built in components of the host module 300, externally coupled components or part of a common integrated circuit that includes host module 300 and the components of the wireless interface device 357 or 359.

As illustrated, the host module 300 includes a processing module 350, memory 352, power receiving unit 325, output interface 356, input interface 358, and radio interfaces 354 and 355. The processing module 350 and memory 352 execute the corresponding instructions that are typically performed by the 18, 20, 22, 26, 28 and 30 or an associated peripheral device. For example, for a cellular telephone, tablet, Bluetooth device or WLAN node the processing module 350 performs the corresponding communication functions in accordance with a particular cellular telephone, Bluetooth or WLAN standard.

In the embodiment shown, the power receiving unit 325 wirelessly couples with a PTU, such as PTU 200 to implement wireless charging of the wireless communication device. In this embodiment, power receiving unit 325 receives wireless power transfers from the PTU to charge the battery of the wireless communication device and/or to provide other system power. The PRU 325 optionally includes a dedicated wireless radio unit (WRU) 345 to directly engage in the exchange of control data via a wireless connection.

In one example of operation, PTU 200 and PRU 325 operate in accordance with a loosely coupled wireless power transfer specification such as the A4WP baseline system specification 1.0 (BSS 1.0), however the Wireless Power Consortium (WPC) Qi low power specification or other wireless power transfer parameters can likewise be employed. In one example of operation, a 6.78 MHZ signal is sent from the power transmitting unit 200 to the PRU 325 to transfer energy to charge the wireless communication device in conjunction with a charging session. Control information is exchanged between the PTU 200 and each of the PRU 325 via a 2.4 GHz Bluetooth LE compatible link to control the power transfer from the PTU to the PRU 325.

The radio interfaces 354 and 355 each communicate with a processing module 350 of the corresponding wireless interface device 357 or 359. The wireless interface devices 357 and 359 can include a digital-to-analog converter (DAC), an analog to digital converter (ADC), and a physical layer module (PHY) that operate via a cellular telephone standard such as a 3G or 4G or other standard, an 802.11 standard, a Bluetooth standard or in accordance with one or more other communication protocols. The radio interfaces 354 and 355 allow data to be received from and transmitted to external devices via the wireless interface devices 357 and 359 and antenna section 361. Antenna section 361 can include a single antenna or a plurality of antennas and appropriate impedance matching circuitry, diplexers, switches and or other components to couple the antenna section to the wireless interface devices 357 and 359.

For data received from one of the wireless interface devices 357 or 359 (e.g., inbound data), the radio interface 354 or 355 provides the data to the processing module 350 for further processing and/or routing to the output interface 356. The output interface 356 provides connectivity to an output display device such as a display, monitor, speakers, etc. such that the received data may be displayed. The radio interfaces 354 and 355 also provide data from the processing module 350 to the wireless interface devices 357 and 359. The processing module 350 may receive the outbound data from an input device such as a keyboard, keypad, microphone, etc. via the input interface 358 or generate the data itself. For data received via the input interface 358, the processing module 350 may perform a corresponding host function on the data and/or route it to one of the wireless interface devices 357 or 359 via the corresponding radio interface 354 or 355.

Processing module 350 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 352 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 350 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. While a particular bus architecture is presented in conjunction with bus 301, other architectures are likewise possible.

In operation, the power receiving unit 325 receives a wireless power signal from a PTU, such as PTU 200, to charge the wireless communication device under control of the processing module 350 or a dedicated processor of PRU 325 and in conjunction with a charging session with the PTU. The WRU 345 operates under control of the processing module 350 or a dedicated processor of PRU 325 to establish a wireless connection with the PTU via a connection establishment procedure. The WRU 345 exchanges control data with the power transmitting unit via the wireless connection. The processing module 350 or a dedicated processor of PRU 325 uses the control data to implement the charging session between the PTU 200 and the PRU 325. While described above in conjunction with a BLE wireless control channel between the PTU 200 and PRU 325, other wireless control channels using other wireless standards and/or load modulation of the wireless power signal can likewise be employed.

The PRU 325 can include a receive resonator having a control element that allows the magnetic field produced by the PTU to be steered or otherwise controlled, and/or that allows the impedance of the receive resonator to be controlled to improve power transfer to the PRU 325. Further details including several optional functions and features are described in conjunction with FIGS. 4-14 that follow.

Figure 4:
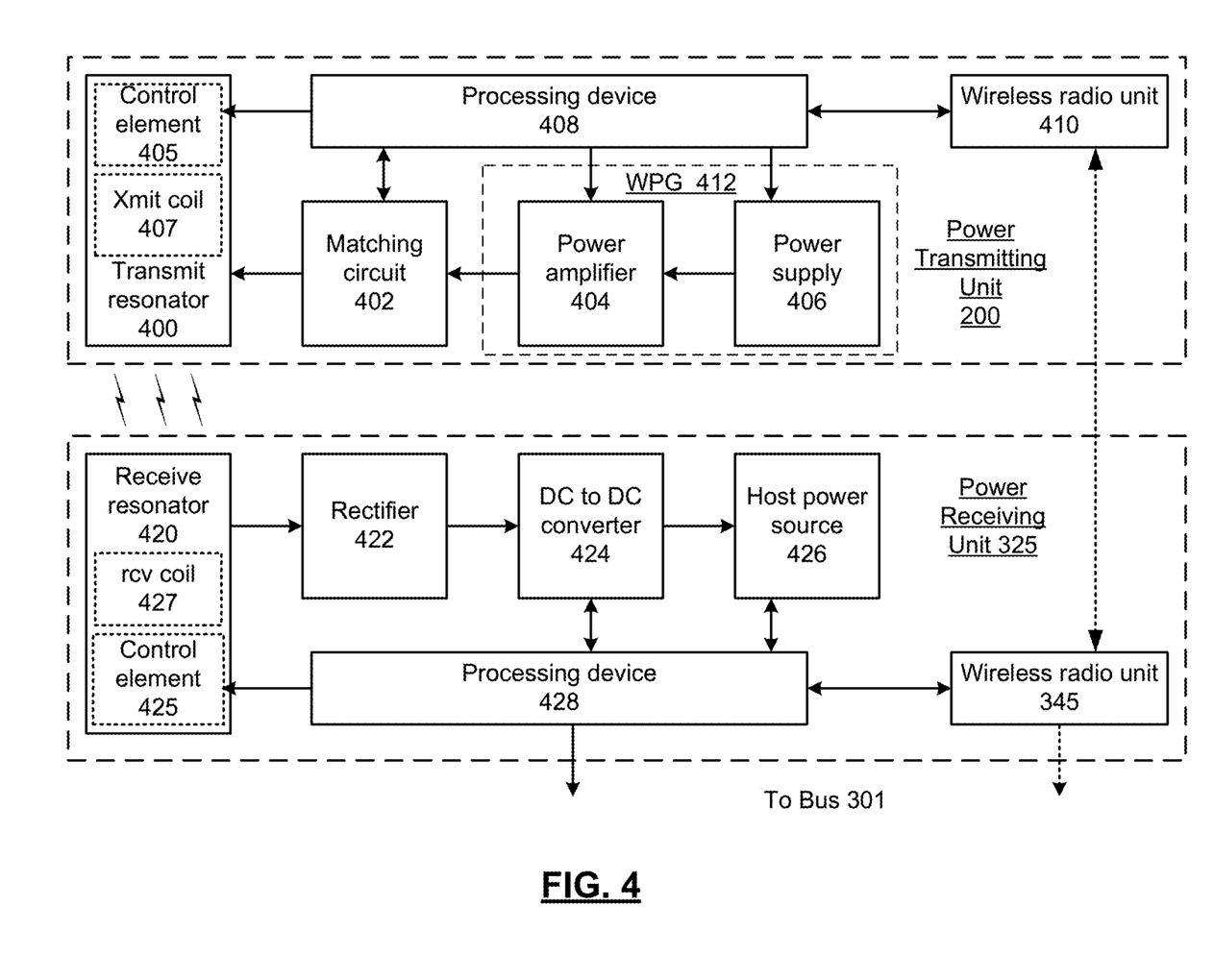
FIG. 4 is a schematic block diagram of an embodiment of a power transmitting unit and a power receiving unit.

FIG. 4 is a schematic block diagram of an embodiment of a power transmitting unit and a power receiving unit. In particular, PTU 200 includes a transmit resonator 400, matching circuit 402, power amplifier 404 power supply 406, processing device 408 and wireless radio unit 410. PRU 325 includes a receive resonator 420, a rectifier 422, a DC-to-DC converter 424, a host power source 426 such as a battery and a processing device 428. In addition, PRU 325 includes the wireless radio unit 345 as previously described. As shown, the processing device 428 and/or the wireless radio unit 345 can be coupled to the bus 301.

In operation, the wireless power generator 412 is configured to generate a wireless power signal via power supply 406 and power amplifier 404. The impedance matching circuit 402 couples the wireless power signal to the transmit resonator 400 that transmits the wireless power signal via a transmit magnetic field to the power receiving unit 325. The wireless power signal can conform with a loosely coupled wireless power transfer specification such as the A4WP baseline system specification 1.0 (BSS 1.0) or other wireless power transfer standard. For example, a 6.78 MHZ signal is sent from the power transmitting unit 200 as the transmit magnetic field. The power receiving unit 325 receives a wireless power signal from PTU 200 to charge the host power source 426 under control of the processing device 428. The wireless power signal is received by the receive resonator 420, rectified by rectifier 422 and converted into a DC charging signal by DC-to-DC converter 424 for charging of the host power source 426 and/or for providing additional system power. The processing device 428 monitors and controls the charging to, for example, avoid over-voltage and under-voltage conditions, high temperature events, and/or other detrimental conditions. The functionality ascribed to processing device 428 can be implemented via processing module 350 or via one or more separate processing devices. The processing device 428 also generates the parameters and control data in the form of load information, received power, load impedance, voltage delta, battery voltage, received signal strength and/or other parameters and control information that can be used for controlling the receive resonator 420 via control element 425 and/or transmitted via the wireless radio units 345 and received via the wireless radio unit 410 for use by processing device 408. In addition or in the alternative to feedback received from the PRU 325, the processing device 408 can monitor transmit power, transmit voltage, transmit current and/or transmit impedance, such as using one or more voltage or current sensors coupled to matching circuit 402. These parameters and control information can be used by the processing device 408 to control the parameters of the power supply 406, power amplifier 404 and/or the matching circuit 402 in order to maintain power transfer efficiency, maximize or otherwise improve power transfer, avoid over-voltage and under-voltage conditions, high temperature events, and/or other detrimental conditions.

In various embodiments, the transmit resonator 400 includes a transmit coil 407 having one or more turns of wire or other conductive material. In particular, the transmit coil 407 can be a high quality (Q) inductor that is tuned to the frequency of the wireless power signal and configured to generate the transmit magnetic field in response to the wireless power signal. The transmit resonator 400 further includes a control element 405 that operates based on one or more control signals from the processing device 408 to control a resonant frequency, impedance and/or beam pattern of the transmit resonator 400.

For example, the control element 405 can include one or more variable magnetic elements such as ferrite cores, soft iron cores or other elements arranged adjacent to the transmit coil 407 and configured to adjust the transmit magnetic field to one of a plurality of magnetic beam patterns in response to control signal(s) generated by the processing device 408. The transmit magnetic field can be steered by driving the ferrites to control their reluctance.

In various embodiments, the processing device 408 can operate via a look-up table, state machine or control algorithm to select a particular magnetic beam pattern based on current parameters and control information generated internally to the PTU 200 or received from the PRU 325. In other embodiments, the processing device 408 can operate via a search algorithm to iteratively evaluate magnetic beam patterns based on current parameters and control information generated internally to the PTU 200 or received from the PRU 325, to select a particular magnetic beam patterns. In one example, the processing device 408 generates the control signals for controlling the control element 405 based control data received via wireless radio unit 410 that indicates an amount of wireless power received by the PRU 325. In another example, a sensor included in matching circuit 402 generates a signal that indicates a reflected impedance of the PRU 325 an amount of impedance mismatch with the power amplifier or other indication of impedance mismatch that is used by the processing device 408 to determine the amount of wireless power received by the power receiving unit based on the reflected impedance and/or to otherwise to generate the control signals to reduce or eliminate the impedance mismatch. In this fashion, the transmit magnetic field produced by the transmit resonator 400 can be steered or otherwise controlled to maximize power transfer or promote power efficiency.

In a further example, the control element 405 can include one or more adjunct coils or arranged adjacent to the transmit coil 407 and configured to adjust the impedance or resonant frequency of the transmit coil 407 in response to control signal(s) generated by the processing device 408. In various embodiments, the processing device 408 can operate via a look-up table, state machine or control algorithm to adjust the impedance and/or resonant frequency of the transmit coil 407 based on current parameters and control information generated internally to the PTU 200 or received from the PRU 325. In other embodiments, the processing device 408 can operate via a search algorithm to iteratively adjust the impedance and/or resonant frequency of the transmit coil 407 based on current parameters and control information generated internally to the PTU 200 or received from the PRU 325, to select an impedance and/or resonant frequency of the transmit coil 407 to maximize power transfer or promote power efficiency.

While the forgoing has focused on the operation of the transmit resonator 400, the receive resonator 420 can similarly include a control element 425 that operates under control of processing device 428 to control a resonant frequency, impedance and/or beam pattern of the receive resonator 420. For example, the control element 425 can include one or more variable magnetic elements such as ferrite cores, soft iron cores or other elements arranged adjacent to the receive coil 427 and configured to adjust the received magnetic field to one of a plurality of magnetic beam patterns in response to control signal(s) generated by the processing device 428. The received magnetic field can be steered by driving the ferrites to control their reluctance.

In various embodiments, the processing device 428 can operate via a look-up table, state machine or control algorithm to adjust the magnetic beam pattern based on current parameters and control information generated internally to the PRU 325 or received from the PTU 200. In other embodiments, the processing device 428 can operate via a search algorithm to iteratively evaluate magnetic beam pattern adjustments based on current parameters and control information generated internally to the PRU 325 or received from the PTU 200, to select a particular magnetic beam pattern adjustment and/or to improve impedance matching. In one example, the processing device 408 generates the control signals for controlling the control element 425 based on an amount of wireless power or signal strength received by the PRU 325. In this fashion, the magnetic field received by the receive resonator 420 can be controlled to maximize power transfer or promote power efficiency.

In a further example, the control element 425 can include one or more adjunct coils arranged adjacent to the receive coil 427 that are configured to adjust the impedance or resonant frequency of the receive coil 427 in response to control signal(s) generated by the processing device 428. In various embodiments, the processing device 428 can operate via a look-up table, state machine or control algorithm to adjust the impedance and/or resonant frequency of the receive coil 427 based on current parameters and control information generated internally to the PRU 325 or received from the PTU 200. In other embodiments, the processing device 428 can operate via a search algorithm to iteratively adjust the impedance and/or resonant frequency of the receive coil 427 based on current parameters and control information generated internally to the PRU 325 or received from the PTU 200, to select an impedance and/or resonant frequency of the receive coil 427 to maximize power transfer or promote power efficiency.

Further examples of such transmit resonators 400 and receive resonators 420 are presented in conjunction with FIGS. 5-10.

Figure 5:
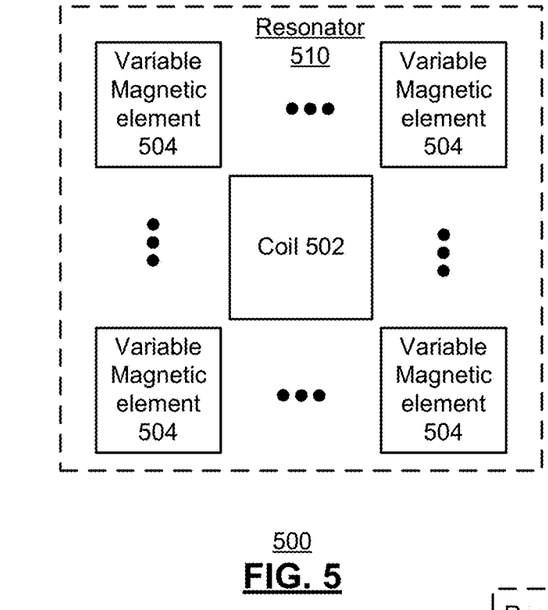
FIG. 5 is a schematic block diagram of an embodiment of a resonator.

FIG. 5 is a schematic block diagram 500 of an embodiment of a resonator. In particular, a resonator 510 is presented such as transmit resonator 400 or receive resonator 420 that includes a coil 502 such as transmit coil 407 or receive coil 427. As previous described, the coil 502 can include one or more turns of wire or other conductive material. In particular, the coil 502 can be a high quality (Q) inductor that is tuned to the frequency of the wireless power signal and configured to transmit or receive a magnetic field corresponding to the wireless power signal. In the configuration shown a plurality of variable magnetic elements 504 are arranged adjacent to, and around the periphery of, the coil 502 to adjust the magnetic beam transmitted or received by the coil 502.

The variable magnetic elements 504 can be implemented via ferrite elements, soft iron cores or other magnetic elements that can be driven or otherwise controlled to adjust the magnetic field pattern of the coil 502. Magnetic flux operates in a closed loop as described by Maxwell's equations. The path of the loop depends on the reluctance of the surrounding materials. In particular, the magnetic flux tends to follow a path of least reluctance. In this fashion, adjustments to the reluctance of the variable magnetic elements 504 operate to modify the magnetic field that corresponds to the wireless power signal so as to steer the magnetic field to achieve desirable results. In addition, the change in reluctance of the variable magnetic elements 504 operate to modify the impedance of the coil 502 in such a way as to improve impedance matching and power transfer.

Figure 6:
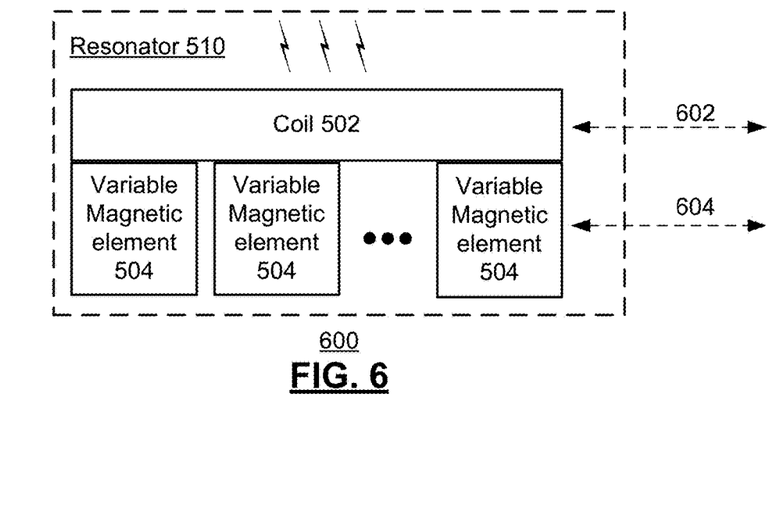
FIG. 6 is a schematic block diagram of an embodiment of a resonator.

FIG. 6 is a schematic block diagram 600 of an embodiment of a resonator. In particular, another embodiment of a resonator 510 is presented such as transmit resonator 400 or receive resonator 420 that includes a coil 502 such as transmit coil 407 or receive coil 427. In this example, the coil 502 is a planar or substantially planar coil that includes one or more turns of wire or other conductive material arranged in accordance with the plane 602. In the configuration shown, a plurality of variable magnetic elements 504 are arranged adjacent to, and in a plane 604 behind the coil

502 to adjust the magnetic beam transmitted or received by the coil 502. The planes 602 and 604 are shown as parallel or substantially parallel, however other configurations are possible.

It should be noted that the diagram is not necessarily shown to scale and further, while a side view is shown, the variable magnetic elements 504 can be arranged in a two-dimensional pattern or array in the plane 604 corresponding to the dimensions of the coil 502. Further, while not expressly shown, the dimensions of the two-dimensional pattern or array of the variable magnetic elements 504 may be greater than or less than the outer dimensions of the coil 502.

As previously discussed, the variable magnetic elements 504 can be implemented via ferrite elements, soft iron cores or other magnetic elements that can be driven or otherwise controlled to adjust the magnetic field pattern of the coil 502. In this fashion, adjustments to the reluctance of the variable magnetic elements 504 operate to modify the magnetic field that corresponds to the wireless power signal so as to steer the magnetic field and/or modify the coil impedance to achieve desirable results.

Figure 7:
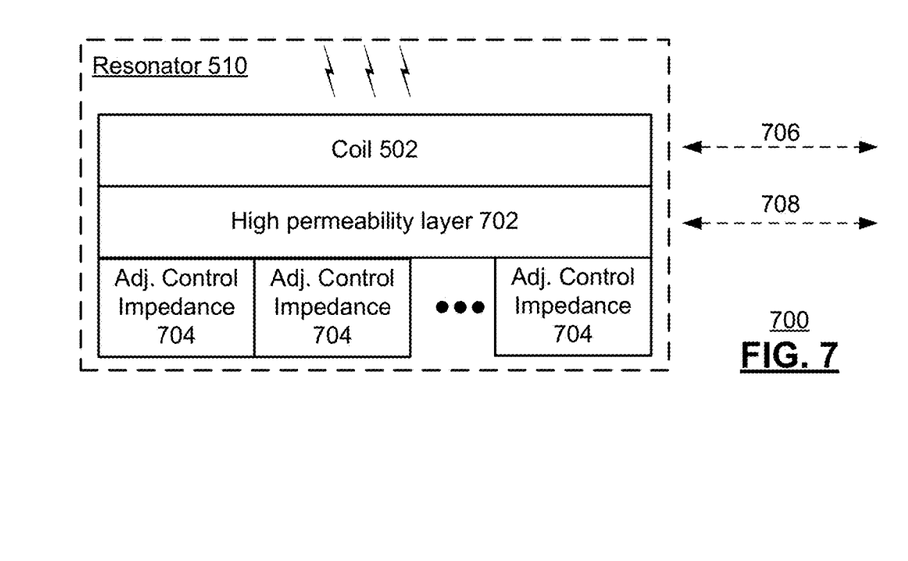
FIG. 7 is a schematic block diagram of an embodiment of a resonator.

FIG. 7 is a schematic block diagram 700 of an embodiment of a resonator. In particular, another embodiment of a resonator 510 is presented such as transmit resonator 400 or receive resonator 420 that includes a coil 502 such as transmit coil 407 or receive coil 427. In this example, the coil 502 is a planar or substantially planar coil that includes one or more turns of wire or other conductive material arranged in accordance with the plane 706. In the configuration shown, a high permeability layer 702 is arranged adjacent to, and in a plane 708 behind the coil 502 to improve the performance of the coil 502 and further to operate as a variable magnetic element.

For example, the high permeability layer 702 can be implemented via a substrate embedded with metallodielectric inclusions that exhibit resonant (high) effective permeability values in desired frequency ranges in the operating frequency of the coil 502. Note that the size, shape, and/or distribution of the metallodielectric inclusions, may vary to provide a desired permeability. The resonator 510 further includes one or more adjustable control impedances 704 in a third layer behind the high permeability layer 702. The adjustable control impedances 704 operate under the control of control signals generated by processing device 408 or 428 to tune the permeability of the high permeability layer 702, thereby tuning the properties (e.g., quality factor, inductance, resistance, reactance, etc.) of the coil 502 and/or to produce a desired magnetic beam pattern of the coil 502. It should be noted that the reluctance of the high permeability layer 702 is inversely proportional to its permeability and therefore adjustments in permeability result in inversely corresponding changes in reluctance.

It should be noted that the diagram is not necessarily shown to scale and further, while a side view is shown, the adjustable control impedances 704 can be arranged in a two-dimensional pattern or array corresponding to the dimensions of the high permeability layer 702. Further, while not expressly shown, the dimensions of the high permeability layer 702 may be greater than or less than the outer dimensions of the coil 502. While the high permeability layer 702 is described above as being constructed of a substrate having metallodielectric inclusions, other layers of high permeability material can likewise be employed to operate under control of the adjustable control impedances 704 to modify the magnetic field that corresponds to the wireless power signal so as to steer the magnetic field and/or modify the coil impedance to achieve desirable results.

Figure 8:
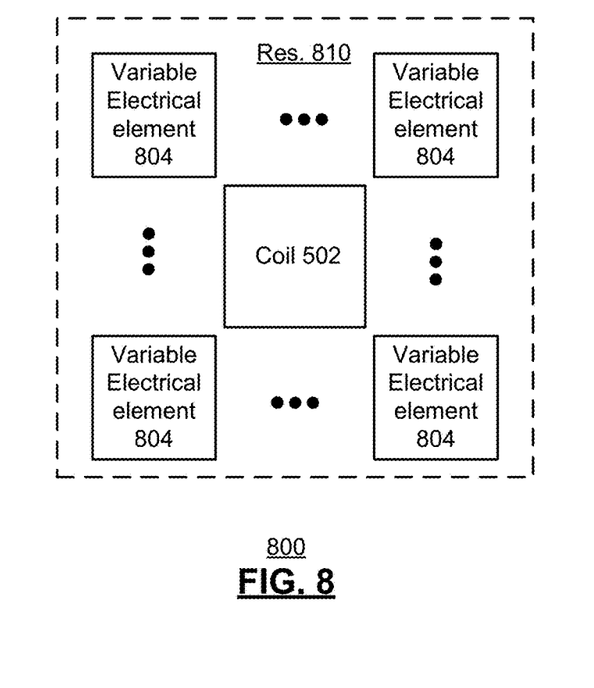
FIG. 8 is a schematic block diagram of an embodiment of a resonator.

FIG. 8 is a schematic block diagram 800 of an embodiment of a resonator. In particular, a resonator 810 is presented such as transmit resonator 400 or receive resonator 420 that includes a coil 502 such as transmit coil 407 or receive coil 427. As previous described, the coil 502 can include one or more turns of wire or other conductive material. In particular, the coil 502 can be a high quality (Q) inductor that is tuned to the frequency of the wireless power signal and configured to transmit or receive a magnetic field corresponding to the wireless power signal. In the configuration shown a plurality of variable electrical elements 804 are arranged adjacent to, and around the periphery of, the coil 502 to adjust the impedance and/or the resonant frequency of the coil 502.

The variable electrical elements 804 can be implemented via adjustable impedances or small coils that can be driven or otherwise controlled to adjust the impedance and/or the resonant frequency of the coil 502. In particular, a variable resonant tank circuit in proximity to the coil 502 induces a mutual inductance on the coil 502 that can modify the inductance of the coil 502, and therefore its impedance and resonant frequency. A small coil, with as little as a single turn, and driven by the wireless power signal can likewise operate to vary the impedance and resonant frequency based on the amplitude and phase of the driving signal.

Figure 9:
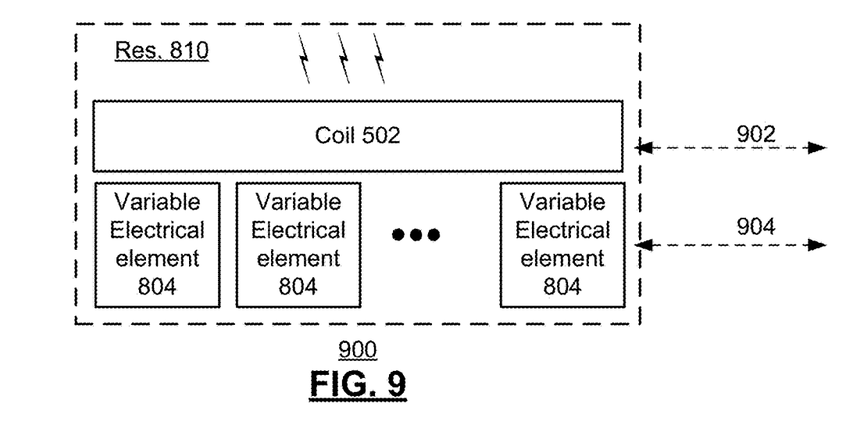
FIG. 9 is a schematic block diagram of an embodiment of a resonator.

FIG. 9 is a schematic block diagram 900 of an embodiment of a resonator. In particular, another embodiment of a resonator 810 is presented such as transmit resonator 400 or receive resonator 420 that includes a coil 502 such as transmit coil 407 or receive coil 427. In this example, the coil 502 is a planar or substantially planar coil that includes one or more turns of wire or other conductive material arranged in accordance with the plane 902. In the configuration shown, a plurality of variable electrical elements 804 are arranged adjacent to, and in a plane 904 behind the coil 502 to adjust the impedance and/or the resonant frequency of the coil 502. The planes 902 and 904 are shown as parallel or substantially parallel however other configurations are possible.

It should be noted that the diagram is not necessarily shown to scale and further, while a side view is shown, the variable electrical elements 804 can be arranged in a two-dimensional pattern or array in the plane 904 corresponding to the dimensions of the coil 502. Further, while not expressly shown, the dimensions of the two-dimensional pattern or array of the variable electrical elements 804 may be greater than or less than the outer dimensions of the coil 502.

Figure 10:
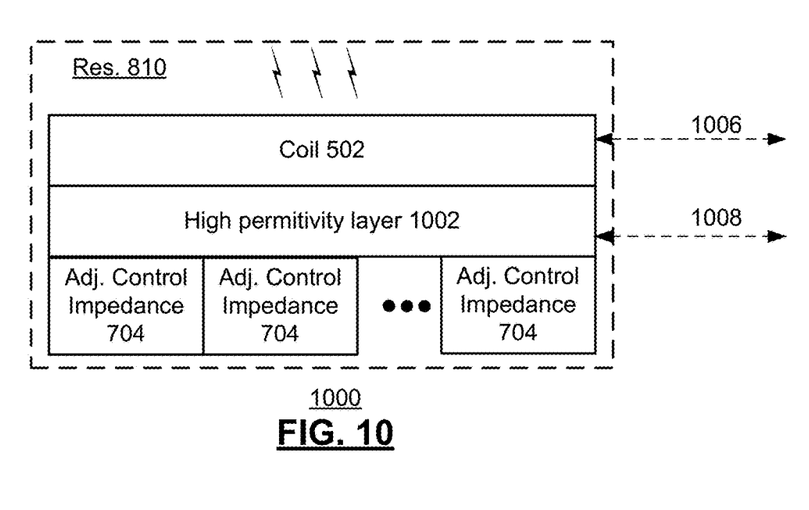
FIG. 10 is a schematic block diagram of an embodiment of a resonator.

FIG. 10 is a schematic block diagram 1000 of an embodiment of a resonator. In particular, another embodiment of a resonator 810 is presented such as transmit resonator 400 or receive resonator 420 that includes a coil 502 such as transmit coil 407 or receive coil 427. In this example, the coil 502 is a planar or substantially planar coil that includes one or more turns of wire or other conductive material arranged in accordance with the plane 1006. In the configuration shown, a high permittivity layer 1002 is arranged adjacent to, and in a plane 1008 behind the coil 502 to operate as a variable electrical element.

For example, the high permittivity layer 1002 can be implemented via a substrate embedded with metallodielectric inclusions that exhibit resonant (high) effective permittivity values in desired frequency ranges in the operating frequency of the coil 502. Note that the size, shape, and/or distribution of the metallodielectric inclusions, may vary to provide a desired permittivity. The resonator 510 further includes one or more adjustable control impedances 704 in a third layer behind the high permittivity layer 1002. The adjustable control impedances 704 operate under the control of control signals generated by processing device 408 or 428 to tune the permittivity of the high permittivity layer 1002, thereby tuning the properties (e.g., quality factor, inductance, resistance, reactance, etc.) of the coil 502.

It should be noted that the diagram is not necessarily shown to scale and further, while a side view is shown, the adjustable control impedances 704 can be arranged in a two-dimensional pattern or array corresponding to the dimensions of the high permittivity layer 1002. Further, while not expressly shown, the dimensions of the high permittivity layer 1002 may be greater than or less than the outer dimensions of the coil 502. While the high permittivity layer 1002 is described above as being constructed of a substrate having metallodielectric inclusions, other layers of high permittivity material can likewise be employed to operate under control of the adjustable control impedances 704 to modify the impedance and/or resonant frequency of the coil 802.

Figure 11:
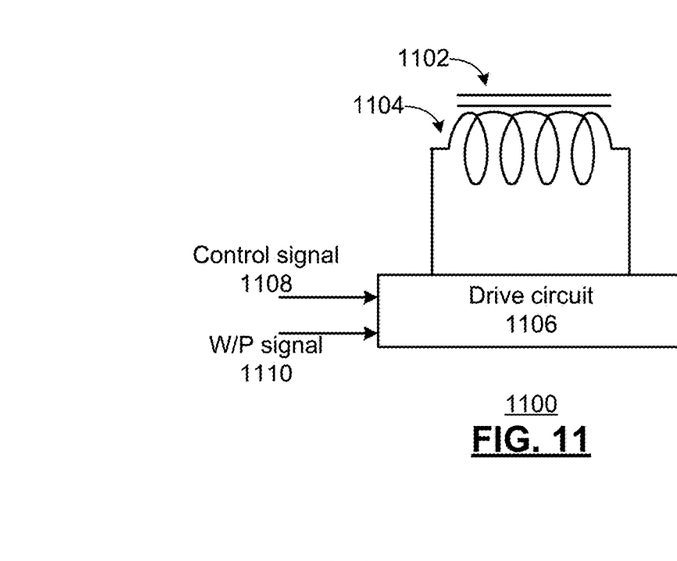
FIG. 11 is a schematic block diagram of an embodiment of a control element.

FIG. 11 is a schematic block diagram 1100 of an embodiment of a control element. In particular, a variable magnetic element, such as variable magnetic element 504 is shown that includes a ferrite element 1102 such as a ferrite bar, toroid or other ferrite. The variable magnetic element also includes a coil 1104 and a drive circuit 1106 that drives the coil 1104 via the wireless power signal 1110 in response to the control signal 1108 to control the magnetic reluctance of the ferrite element. In particular, the reluctance of the ferrite element 1102 can be adjusted by adjusting the amplitude and/or phase of the wireless power signal 1110 via a variable phase shifter and/or variable attenuator included in the drive circuit 1106.

Figure 12:
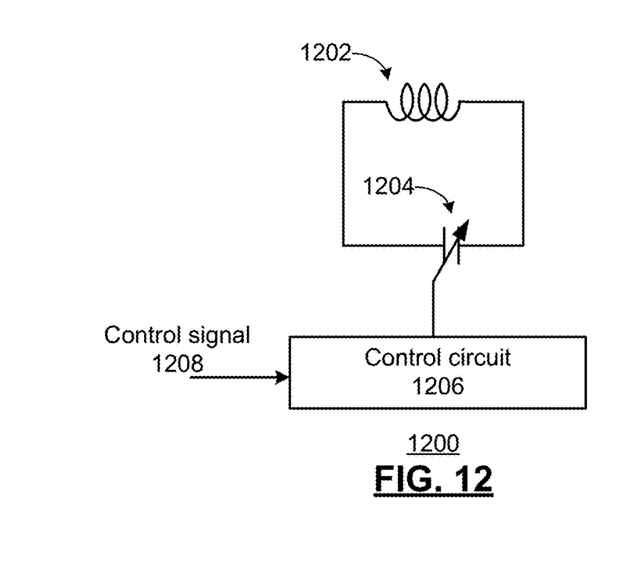
FIG. 12 is a schematic block diagram of an embodiment of an adjustable impedance.

FIG. 12 is a schematic block diagram 1200 of an embodiment of an adjustable impedance. In particular, an adjustable impedance, such as variable electrical control element 804 or adjustable control impedance 704 is shown that includes a resonant tank circuit having an inductor 1202 and variable capacitor 1204 that varies under control of the control circuit 1206 and control signal 1208. The control circuit 1206 and variable capacitor 1204 can be implemented via a plurality of fixed capacitors and a switch network, via a tunable microelectromechanical system (MEMS) or other variable capacitor. While a parallel tank circuit is shown, a series tank circuit can likewise be included. Further, a fixed or variable resistor may likewise be included in the tank circuit in series or in parallel.

Figure 13:
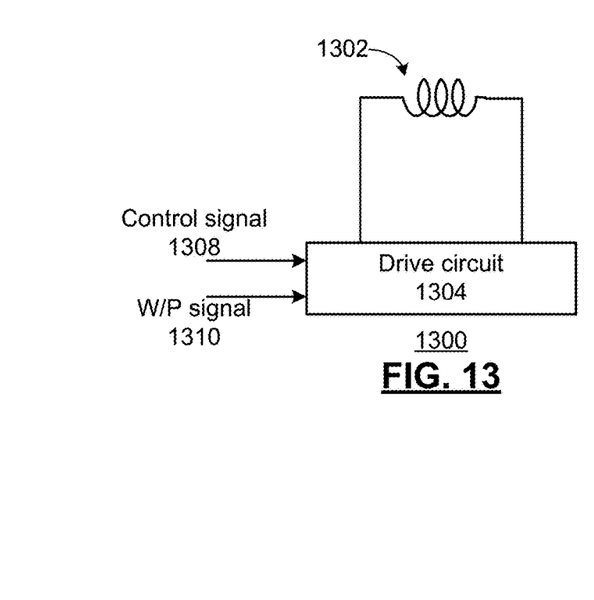
FIG. 13 is a schematic block diagram of an embodiment of a control element.

FIG. 13 is a schematic block diagram 1300 of an embodiment of a control element. In particular, a variable electrical element, such as variable electrical control element 804 is shown that includes a coil 1302. The drive circuit 1304 drives the coil 1302 via the wireless power signal 1310 in response to the control signal 1308 to control the emissions by the coil.

In particular, the emissions by the coil 1302 can be adjusted by adjusting the amplitude and/or phase of the wireless power signal 1310 via a variable phase shifter and/or variable attenuator included in the drive circuit 1304. This controls the effective impedance of the coil 1302 and therefore affects the parameters of the coil 502 via the magnetic coupling therebetween.

Figure 14:
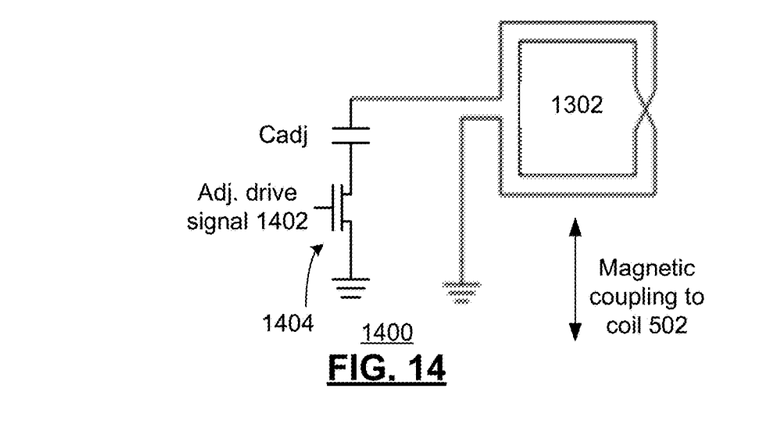
FIG. 14 is a schematic block diagram 1400 of an embodiment of a control element.

FIG. 14 is a schematic block diagram 1400 of an embodiment of a control element. In particular, a variable electrical element, such as variable electrical control element 804 is shown that includes a coil 1302 that is configured to be magnetically coupled to the coil 502 to adjust the impedance and/or the resonant frequency of the coil 502. The drive circuit 1404 is capacitively coupled to drive the coil 1302 via a low power adjustable drive signal 1402. In particular, the impedance of the tank circuit formed by the coil 1302 and the adjustment capacitor Cadj can be adjusted by adjusting the amplitude and/or phase of the adjustable drive signal 1402. This affects the parameters of the coil 502 via the magnetic coupling therebetween and can be used to improve impedance matching, power transfer, etc. While not specifically shown, adjustment capacitor Cadj could be replaced by an inductance, a switched bank of capacitors or deleted altogether. Also, the drive circuit 1404 could be replaced by a plurality of switches that adjust the impedance as seen by the coil 1302.

Figure 15:
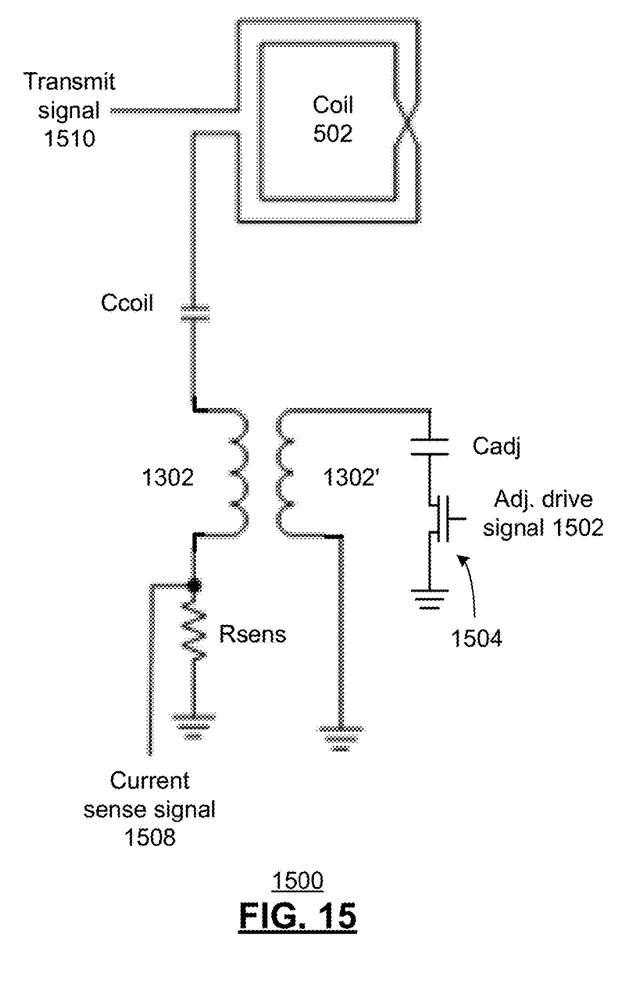
FIG. 15 is a schematic block diagram 1500 of an embodiment of a control element.

FIG. 15 is a schematic block diagram 1500 of an embodiment of a control element. In particular, a variable electrical element, such as variable electrical control element 804 is shown that includes a coil 1302 that is configured to be magnetically coupled to the coil 502 to adjust the impedance and/or the resonant frequency of the coil 502. The coil 502 is driven by a transmit signal 1510.

This circuit can operate similarly to the circuit of FIG. 14. In this example, the coil 1302 is placed in series with the coil 502 via a coil capacitor, Ccoil, and sense resister Rsens that generates a current sense signal 1508. The current sense signal 1508, can be used, for example, to determine the voltage current phase difference, impedance mismatch, output power or other performance measure that can, in turn, be used to generate the adjustable drive signal 1502.

In the embodiment shown, the drive circuit 1504 is capacitively coupled to drive the coil 1302' via a low power adjustable drive signal 1502. This provides isolation between the main transmit signal current and the control current and can allow for lower adjustment voltages. In particular, the emissions by the coil 1302' can be adjusted by adjusting the amplitude and/or phase of the adjustable drive signal 1502. These adjustments to the adjustable drive signal 1502 modify the impedance of the main coil via magnetic coupling between the coils 1302 and 1302' and can be employed to improve impedance matching and/or power transfer.

Figure 16:
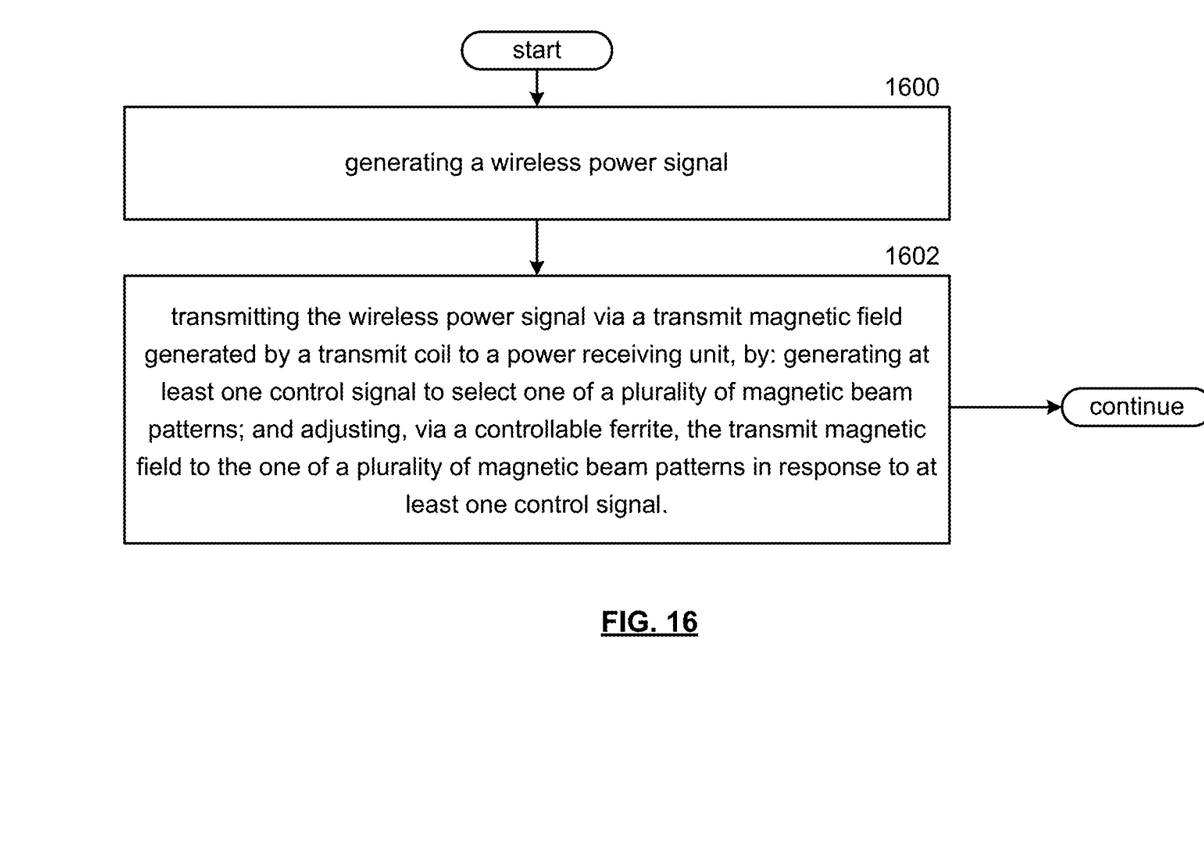
FIG. 16 is a flowchart representation an embodiment of a method.

FIG. 16 is a flowchart representation an embodiment of a method. In particular, a method is presented for use in conjunction with one or more features and functions described in conjunction with FIGS. 1-15. Step 1600 includes generating a wireless power signal. Step 1602 includes transmitting the wireless power signal via a transmit magnetic field generated by a transmit coil to a power receiving unit, by: generating at least one control signal to select one of a plurality of magnetic beam patterns; and adjusting, via a controllable ferrite, the transmit magnetic field to the one of a plurality of magnetic beam patterns in response to at least one control signal.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A device comprising:
a power receiving unit including:
a receive resonator configured to receive a wireless power signal from a power transmitting unit having a transmit coil and at least one variable magnetic element that adjusts at least one property of the transmit coil by varying a reluctance of the at least one variable magnetic element in response to control data;
a processor configured to generate the control data; and
a wireless radio configured to transmit the control data to the power transmitting unit to select the reluctance corresponding to the at least one property of the transmit coil.

2. The device of claim 1 wherein the at least one property of the transmit coil includes an impedance of the transmit coil or a magnetic beam pattern of the transmit coil.

3. The device of claim 1 wherein the processor generates the control data to indicate an amount of wireless power received by the power receiving unit.

4. The device of claim 1 wherein the processor generates the control data to indicate a load impedance of the power receiving unit.

5. The device of claim 1 wherein the processor generates the control data to indicate a voltage delta of the power receiving unit.

6. The device of claim 1 wherein the processor generates the control data to indicate a battery voltage of the power receiving unit.

7. The device of claim 1 wherein the processor generates the control data to indicate a received signal strength of the power receiving unit.

8. The device of claim 1 wherein the at least one variable magnetic element includes a plurality of ferrite elements arranged adjacent to the transmit coil.

9. The device of claim 8 wherein the at least one variable magnetic element further includes a coil and a drive circuit that drives the coil in response to the control data to control the reluctance of the plurality of ferrite elements.

10. The device of claim 9, wherein the drive circuit controls the reluctance of the plurality of ferrite elements by adjusting an amplitude or a phase of the wireless power signal.

11. The device of claim 1 wherein the at least one variable magnetic element includes a resonant effective permeability layer and at least one adjustable control impedance that controls the reluctance of the resonant effective permeability layer.

12. A method comprising:
  receiving, via a receive resonator of a power receiving unit, a wireless power signal from a power transmitting unit having a transmit coil and at least one variable magnetic element that adjusts at least one property of the transmit coil by varying a reluctance of the at least one variable magnetic element in response to control data;
  generating via a processor, the control data; and
  transmitting, via a wireless radio, the control data to the power transmitting unit to select the reluctance corresponding to the at least one property of the transmit coil.

13. The method of claim 12 wherein the at least one property of the transmit coil includes an impedance of the transmit coil or a magnetic beam pattern of the transmit coil.

14. The method of claim 12 wherein the control data indicates an amount of wireless power received by the power receiving unit.

15. The method of claim 12 wherein the control data indicates a load impedance of the power receiving unit.

16. The method of claim 12 wherein the control data indicates a voltage delta of the power receiving unit.

17. The method of claim 12 wherein the control data indicates a battery voltage of the power receiving unit.

18. The method of claim 12 wherein the control data indicates a received signal strength of the power receiving unit.

19. The method of claim 12 wherein the at least one variable magnetic element includes a plurality of ferrite elements arranged adjacent to the transmit coil.

20. The method of claim 19, wherein the at least one variable magnetic element further includes a coil and a drive circuit that drives the coil in response to the control data to control the reluctance of the plurality of ferrite elements.

21. The method of claim 12 wherein the at least one variable magnetic element includes a resonant effective permeability layer and at least one adjustable control impedance that controls the reluctance of the resonant effective permeability layer.

22. A power receiving unit comprising:
  a receive resonator configured to receive a wireless power signal from a power transmitting unit having a transmit coil and at least one variable magnetic element that adjusts at least one property of the transmit coil by varying a reluctance of the at least one variable magnetic element in response to control data;
  a processor configured to generate the control data; and
  a wireless radio configured to transmit the control data to the power transmitting unit to select the reluctance corresponding to the at least one property of the transmit coil.

* * * * *